United States Patent [19]

Chasek

[11] 4,303,904

[45] Dec. 1, 1981

[54] UNIVERSALLY APPLICABLE, IN-MOTION AND AUTOMATIC TOLL PAYING SYSTEM USING MICROWAVES

[76] Inventor: Norman E. Chasek, 24 Briar Brae Rd., Stamford, Conn. 06903

[21] Appl. No.: 84,370

[22] Filed: Oct. 12, 1979

[51] Int. Cl.³ ............................ G08G 1/12; H04B 1/00
[52] U.S. Cl. ........................................ 340/23; 340/51; 340/825.54; 343/112 TC; 235/384
[58] Field of Search ............... 340/51, 152 T, 23, 31; 364/464; 455/2, 49, 53, 54, 56; 235/384, 379; 343/112 TC

[56] References Cited

U.S. PATENT DOCUMENTS

| | | | |
|---|---|---|---|
| 3,104,367 | 9/1963 | Grant | 340/51 X |
| 3,109,926 | 11/1963 | Bolton | 340/51 X |
| 3,714,650 | 1/1973 | Fuller et al. | 343/112 TC |
| 3,899,671 | 8/1975 | Stover | 455/56 |
| 4,001,550 | 1/1977 | Schatz | 235/379 |

FOREIGN PATENT DOCUMENTS 1543910 4/1979 United Kingdom ............. 340/23

*Primary Examiner*—Donald J. Yusko
*Attorney, Agent, or Firm*—Parmelee, Johnson, Bollinger & Bramblett

[57] ABSTRACT

Toll collection facilities for tunnels, bridges and turnpikes slow traffic, waste time and fuel, and increase air pollution. Eliminating the need for a toll payment stop would avoid this waste and reduce toll facility operating costs. A single, universally applicable system and apparatus is described that can eliminate most toll stops and simplify funds transfers. The system starts with a lump sum paid in advance to a permanently assigned collection agency's representative. This sum is inserted, electronically, into the memory of a microwave transponder-data-processor, normally kept in the vehicle. As the vehicle passes suitably equipped toll collection facilities, a toll transponder receives billing information from the vehicle transponder, calculates the toll, transmits it back to the vehicle transponder where the toll is electronically subtracted from a stored balance. If the resulting balance is not negative, a pass signal is flashed. The information stored in the vehicle transponder's permanent memory includes a vehicle-owner code, a collection agent's code and a vehicle-class code. The availability of this information and the toll, plus the procedure for increasing the pre-paid balance makes possible a computerized and automated double entry bookkeeping and funds transfer system. Security is achieved by crypto insertion codes. The stored current balance in the vehicle transponder is always indicated by a liquid crystal display.

10 Claims, 11 Drawing Figures

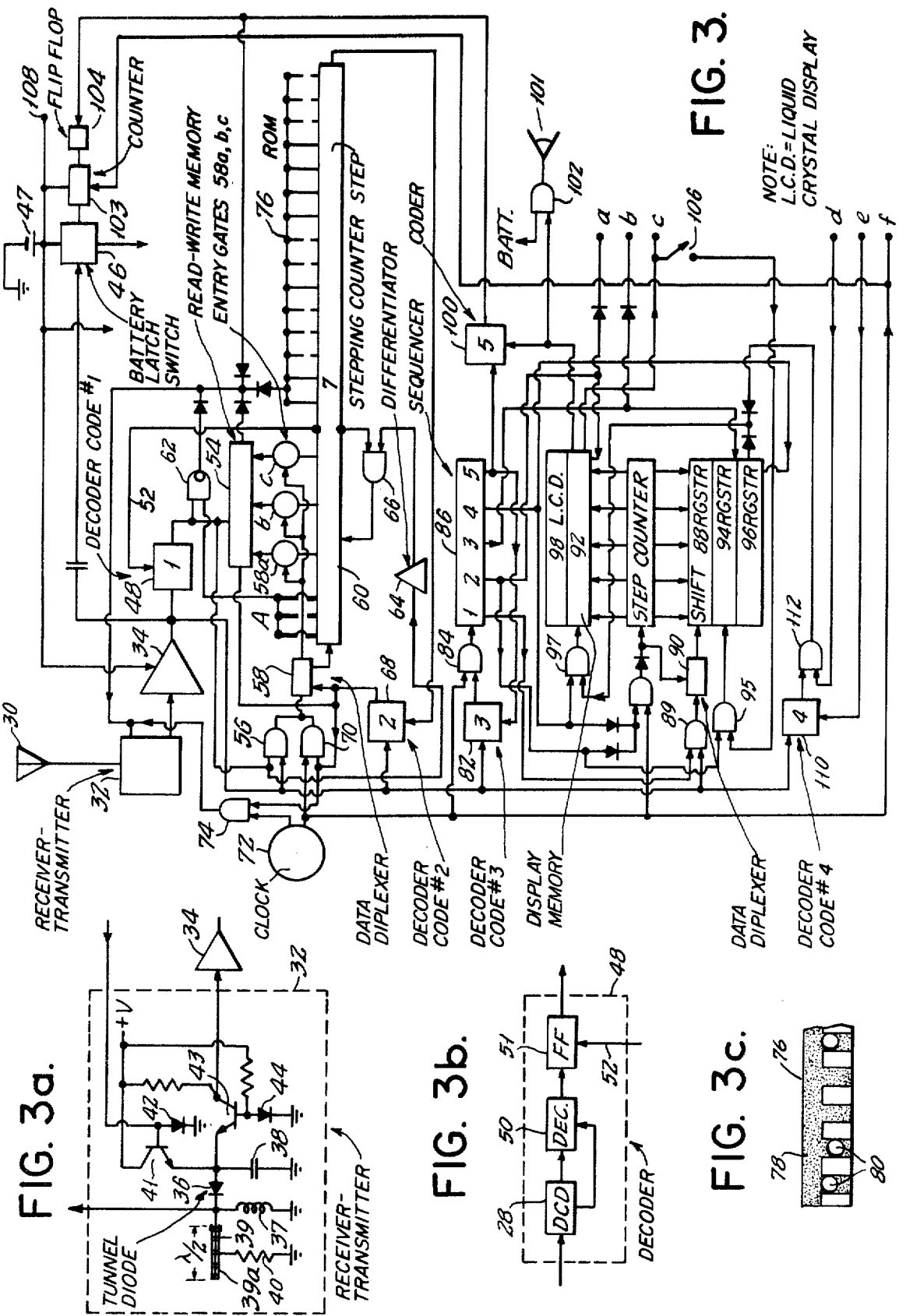

UNIVERSALLY APPLICABLE, IN-MOTION AND AUTOMATIC TOLL PAYING SYSTEM USING MICROWAVES

BACKGROUND OF THE INVENTION

The maximum cost benefit factor that can be derived from an automatic toll paying system is achieved when the system is universally applicable. Toll facilities differ in means of collection and in base rates, the rates often depending on the number of vehicle axles as well as distance traveled. A convenient system would have a motorist pay a lump sum of any amount to any toll authority, and be credited for that amount against future tolls. Any automatic toll paying method must have a relatively simple and efficient means of transferring funds, with appropriate checks and balances. The system must be relatively tamper-proof, fool-proof, enforceable and must operate through snow, ice, rain, fog, dirt and for any expected speed of the vehicle. A properly implemented system would also reduce toll facility operating expenses, save the driver time and fuel, and generate less air pollution for the toll facilities' neighbors.

Present methods aimed at implementing such a service employ only automatic vehicle identification. Such methods require intricate centralized computer facilities for storing and extracting billing information from potentially tens of millions of possible users for each toll transaction. These methods lack flexibility and user connection. They also can create massive operational failures and a feeling on the part of users of being dependent on large, complex and silent computers.

SUMMARY OF THE INVENTION

The universally applicable, automatic system for paying tolls from moving vehicles, described by this invention, would operate in the following manner. Each vehicle using the system would use clearly marked toll lanes that are equipped with a microwave transponder-computer. The vehicle would have a microwave transponder-data-processor on board which carries in its memory a pre-paid balance. As the vehicle approaches the toll facility, it is interrogated by a microwave transponder located at the toll booth. This interrogation releases the vehicle's permanently stored identification code, payment agent's code, vehicle class and, if required, the vehicle's entry location to the facility. A computer at the toll booth calculates the toll from the received information and transmits the amount to the vehicle's transponder. This toll is then subtracted from the stored pre-paid balance. If the balance is not negative, the vehicle is passed through.

The pre-paid balance is paid to a specified agent or authority whose identity is established via a permanently inserted number into the vehicle transponder's memory. Only this agent would have the ability to increase the stored, pre-paid balance for that vehicle using equipment which includes a crypto entry code derived from the vehicle's ID number and a microwave data injection means. Batteries are charged up during this stop. The cash collection agency is then billed by each toll facility that the vehicle might subsequently use. A complete double entry computerized record system can be established from the available data.

The automatic toll paying system is comprised of three major components, the vehicle borne transponder-data-processor, the toll booth transponder-computer and an increasing-cash-balance register. The vehicle borne transponder includes a microwave antenna, detector and transmitter means, memories, logic and computational circuitry and a visual display. The toll booth transponder includes a directional antenna, a superheterodyne receiver, a transmitter, a computer connected to a means for waiving or inhibiting the passage of vehicles that have an insufficient balance or do not have a transponder.

The pre-paid balance is always displayed to the driver by a liquid crystal display. A negative balance can be indicated by a tone when approaching the toll booth. A weak battery is indicated by the display. The preferred vehicle transponder's detector-transmitter described uses a tunnel diode. The power drain of the transponder is near zero until the tunnel diode detector is illuminated. This illumination latches the battery on so it powers the rest of the transponder. When the transaction is complete, the power is turned off except to the pre-paid balance memory and liquid crystal display. The battery latch cannot be turned on again for some designated period thereafter.

The use of very low power microwave has no known health hazard and will penetrate snow, ice, rain, fog and dirt. The transaction is, within reason, independent of vehicular speed, taking several milli-seconds to complete. The computerized bookkeeping system, made possible by this system, can account for unauthorized pre-paid balance credits, stolen transponders, and failed batteries that lose the paid up balance information. The various aspects and advantages of this invention will be more fully understood from a consideration of the following detailed description in conjunction with the accompanying drawings.

BRIEF DESCRIPTION OF THE DRAWINGS

FIG. 3 illustrates a functional block diagram of a preferred vehicle transponder.

FIG. 3a illustrates circuit details of a tunnel diode transponder.

FIG. 3b illustrates a self-timed decoder and actuator.

FIG. 3c illustrates detail of a permanent memory means for vehicle and payment agency identification.

DETAILED DESCRIPTION OF THE INVENTION

This invention describes a system for automatically paying all types of tolls without the need for individual cash transactions or vehicle stops. It consists of both a system and preferred apparatus to implement the system. The apparatus includes a vehicle borne microwave transponder-data-processor, a toll both transponder-computer and registration equipment for increasing the pre-paid cash balance stored in the vehicle transponder's memory.

Figure 1:
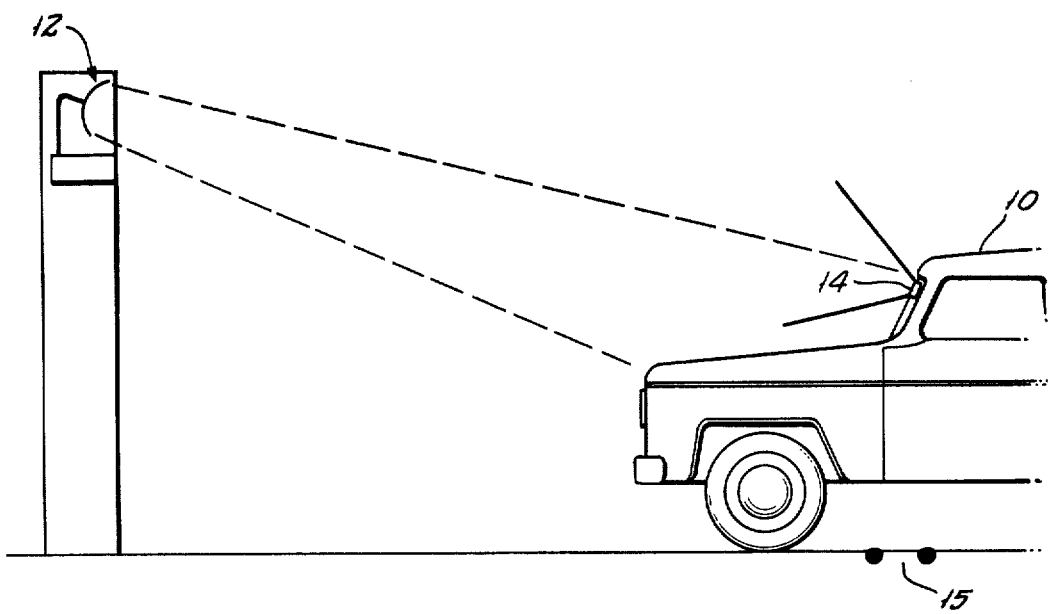
FIG. 1 is a pictorial representation of the toll facility with microwave transponder, approaching vehicle and transponder.

FIG. 1 is a pictorial diagram illustrating the physical locations of the apparatus required for this automatic toll paying system. A vehicle, 10, is shown approaching a toll facility transponder 12. The vehicle has its transponder 14 located so it is visible through its front window. The vehicle may have been interrogated earlier to warn the driver if his pre-paid cash balance is too low. Vehicle sensor, 15, is optional and used to spot check or verify vehicle classification, such as number of axles, this information being normally transferred from vehicle transponder's memory. Toll transponder 12 initiates the transaction by transmitting a microwave signal modulated with a transaction initiating code which is then acknowledged by vehicle transponder 14 with its stored identification codes plus other information. From this information, a toll is computed by a computer at the toll booth. The amount of this toll is then transmitted via microwave back to vehicle transponder 14 and is subtracted from the pre-paid balance stored in the vehicle transponder's memory. If the balance is not negative, a transaction approval code is transmitted which activates a pass permission signal. If the balance is negative, a code is sent which activates a pass denying action.

The automatic toll paying process begins with a cash payment for the vehicle transponder with a balance registered in its memory, usually equal to the cash payment. When the transponder is initially issued, a vehicle and owner identification code plus the cash collection agency's code, if pertinent, is permanently inserted into the transponder's read-only-memory. Along with this code a number is stored indicating the vehicle's class and a cryptographically derived balance increasing entry code. The permanent method of vehicle classification requires that cars pulling trailers cannot use the automatic toll lanes and truck cabs without their trailers would not want to use the automatic toll lanes. Some independent means of vehicle class verification may also be required.

When a vehicle enters a turnpike, where the toll depends on knowing entry and exit locations, the entry location is registered in the vehicle transponder's memory as the vehicle enters such a roadway. A toll gate transmitter reads out its location to each entering vehicle's transponder. This is stored in a read-write memory. When the vehicle leaves the road system, this entry location is read out and transmitted along with the vehicle classification and identification codes. The transponder has a visual display to indicate the current balance and state of the battery to the driver. Also a tone can be emitted, if upon toll booth interrogation, the balance become negative.

When the driver wishes to increase his pre-paid balance, he drives to a cash collection agent representative's booth in whose name the transponder was issued. The agent could be a local toll facility authority. The agent increases the stored balance by the amount of cash paid which is inserted into the vehicle's transponder by special apparatus. The battery is also recharged, and the transaction results are transferred to a permanent bookkeeping system. All subsequent tolls charged to this vehicle will be paid to each billing toll authority by the collection agency that received the cash payment. Since the vehicle's identification and its toll charges are available, an independent automatic double entry bookkeeping system can be set up for transferring funds, for balancing books, for compensating drivers whose battery might have died losing the pre-paid balance or to spot stolen transponders or users in arears.

Figure 2:
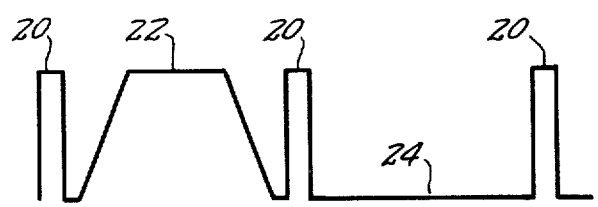
FIG. 2 illustrates a preferred digital modulation for communicating clock and data information and FIG. 2a illustrates a diplexing circuit for separating clock and data signals.
Figure 2A:
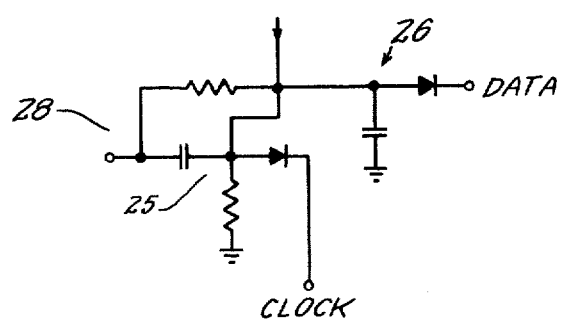

The apparatus to implement this automatic toll paying system uses microwave transmissions because of their relative immunity to snow, ice, rain, fog and dirt. The microwave communications used is half duplex, meaning transmission and reception occur at the same approximate frequency but never simultaneously. This provides the simplest transmission means. Since interactive computer processes are carried out in short sequential data bursts, there is no inexpensive conventional method to clock the data in and out. Therefore, the data modulation to be employed, which will be amplitude modulation, includes quickly accessible clock information sent with the data. The preferred method of sending this information is illustrated in FIG. 2. Clock pulses 20 are narrow occurring periodically at the clock rate just prior to each data bit. The data pulse 22, representing ones, have gradual ramp slopes, zeros are represented by an absence of any ramp pulse, 24. Clock pulses 20 can be separated out from the ramp data pulse by a differentiating capacitor-resistor and diode combination, 25, shown in FIG. 2a. Integrating resistor-capacitor-diode combination 26 separates out the data pulses. The complete circuit, called a data diplexer is referred to frequently in the following detailed description.

FIG. 3 illustrates a functional block diagram of the vehicle transponder. Antenna 30 receives and transmits microwave energy over a wide angular sector. In this illustrative example, a tunnel diode is used for both detection of received signals and for transmitting amplitude modulated microwave energy. The details of receiver-transmitter 32 and amplifier 34 are shown in FIG. 3a. The preferred receiver/transmitter consists of tunnel diode 36, tuning inductor 37, by-pass capacitor 38, and a microwave circuit comprised of two series quarter wave line sections, 39 and 39a, and shunt microwave resistor 40 inserted between them. The quarter wave sections 39 and resistor 40 prevent moding of tunnel diode oscillation and fix the frequency more precisely. Transistor 41 applies a positive modulation voltage to the tunnel diode, assuring a low impedance across the diode while biasing the diode into oscillation. Diode 42 clamps that voltage. When the tunnel diode is biased into oscillation, transistor 43 is turned off. When there is no voltage applied to the tunnel diode, it acts as a detector. Diode 44 maintains a near zero emitter base voltage, on transistor 43. When a microwave signal is detected, a negative voltage is generated across the tunnel diode causing transistor 43 to conduct current. This conduction is further amplified in subsequent amplifier 34 providing adequate output signal to operate all subsequent transponder functions. An equivalent design can be derived for a GaAs FET transistor in place of the tunnel diode which can also serve both as a detector and oscillator.

Amplifier 34 draws negligible current until a microwave signal is detected in R/T 32. The receipt of signal turns on the amplifier and latches switch 46 into a closed position, to power all circuits from battery 47. Normally, without a received signal, only the liquid crystal display 98, its memory 92, and amplifier 34, receive battery power.

The first possible transaction occurs when a vehicle enters a turnpike, for example. The toll booth transmitter, at an entry point, sends a coded message comprised of entry code #1 and the entry point's location code. This code is received by decoder 48 described in FIG. 3b. It is comprised of data diplexer 28, decoder 50 and flip flop 51, which is reset by terminal lead 52. Decoder 43 recognizes its code and places memory 54 in a read-in status and opens gate 56. The data is then clocked into read-write memory 54, by data diplexer 58, entry gates 58a, b and c and stepping counter 60. Transmissions from the initial address code are blocked by gate 62 at this time. When step 7 of stepping counter is reached, decoder 48 is turned off. The turn-off is marked by differentiator 64, whose impulse feeds through gate 66, which has also been opened by step 7. This process clears stepping counter 60 and completes the data entry.

The next possible transaction occurs at a toll payment gate. At such a gate, code #2 is transmitted periodically with empty time allocated to receive responses. When code #2 is received, decoder 68 opens gate 70, biases data diplexer 58, on and puts memory 54 into its read-out mode. As clock 72 feeds in its narrow clock pulses, a binary word is generated by stepping counter 60, each data bit actuated by the trailing edge of the narrow clock pulses. Timing clock pulses that precede each data bit are added to the transmitted data stream through gate 74. These pulses combined with the data pulses create the modulation illustrated in FIG. 2. As step counter 60 progresses, it first generates addressing code A, then the vehicle's entry point to the toll facility, if stored, and then the vehicle's classification and identification codes and cash collection agent's code, which are permanently stored in the ROM positions marked 76. When this read-out is completed, decoder 68 is reset. FIG. 3c, illustrates one means of permanently inserting the vehicle's and agent's codes. This consists of a plastic card with a conductive surface marked by darkened areas 78. Holes, 80, punched in the card mark zeros and no holes mark ones. Contact fingers connect with each conductive mark. The word illustrated here is 00110.

Figure 4:
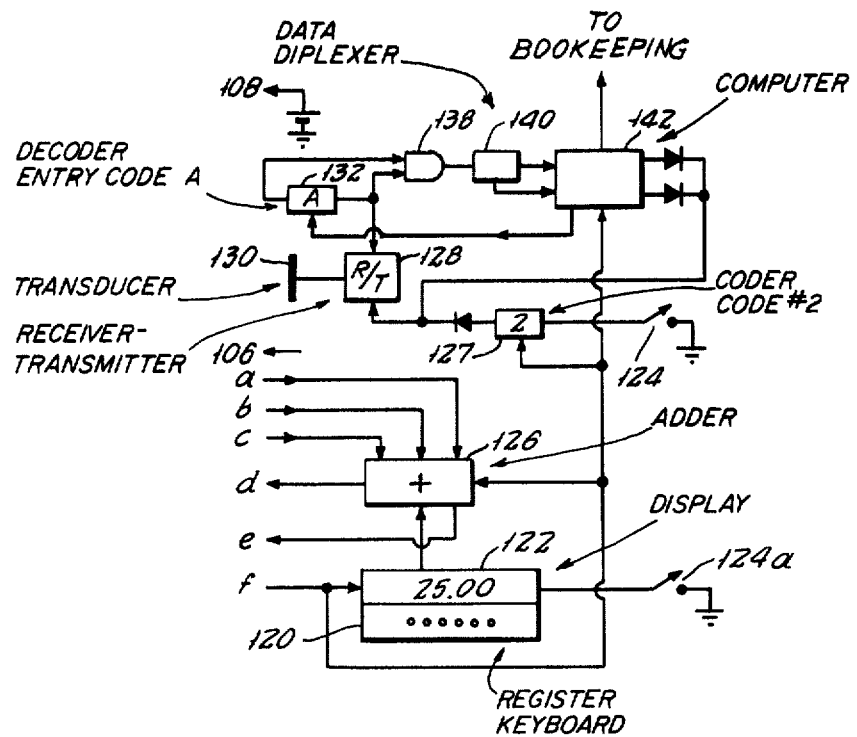
FIG. 4 illustrates a functional block diagram of the apparatus that adds the pre-paid amount into a vehicle transponder.

When code 3 is received by decoder 32, gate 84 opens to clock pulses into sequencer 86, which controls the steps required to compute a new balance. Step 1 reads in the toll charge into shift register 88 through gate 89 and data diplexer 90. Step 2 reads out and clears display memory 92, reading its contents into register 94 through gate 95. Step 3 carries out the subtraction process. Step 4 reads the new number from register 96 into display memory 92 through gate 97. Memory 92 also activates liquid crystal display 98 indicating the new balance. Step 5 reads out an end-of-transaction code from coder 100 which includes information if the balance is a negative number or not. If a negative balance occurs, an optical tone generator 101 can be actuated by gate 102 to warn the driver that he should seek a cash toll collection lane. This tone can also be activated early in the toll booth approach phase. The end-of-transaction code opens battery latching switch 46, activated by flip flop 104, which is fired by output of coder 100. Latching switch 46 cannot be closed again for several minutes being inhibited by counter 103 thereby avoiding double billing for slow traffic. Decoder 110 and gate 112 are used to increase the stored balance in memory 92. Decoder 110 has an individualized code stored in it that is related to the vehicle's ID code. The process of inserting a new pre-paid balance is carried out by register equipment described by the functional block diagram illustrated in FIG. 4 and some of the circuits described in FIG. 3.

When a lump sum cash payment is made, the driver hands over his vehicle's transponder to the collection agent who places the transponder into a register (Please see FIG. 4) that connects into pins a, b, c, d, e and f, open normally closed pin jack 106 and also charging battery via pin 108. The cash payment is registered on register key board 120 and flashes on display 122. Push button 124a enters the pre-paid cash amount into adder 126 and also actuates code 2 from coder 127, which modulates the microwave transmitter in R/T 128, which is connected to transducer 130 that is placed in proximity with antenna 30. Transmission of code 2 actuates transmission of the vehicle's identification and agent codes from the vehicle's transponder. These identification codes are received by the detector in R/T 128. Entry code A is identified by decoder 132, opening gate 138, feeding its received signals to data diplexer 140 which enters the identification codes into computer 142. Computer 142 determines entry code 4 from that transponder's identification code, using a cryptographic sequence and then resets decoder 132. If the collection agent's code is correct, computer 142 reads out derived entry code 4, and code 3 followed by a string of zeros which is modulated onto the microwave transmitter in R/T 128.

A new balance is determined in adder 126 by the following sequence. Clock signals from clock 72 are transferred to the register via pin f. Switch 106 is opened by pin pressure. This open position prevents data stored in memory 92 from being transferred to register 96. Instead the current balance is read-out into adder 126 through pin c. The read-in and addition sequence is signaled by a voltage appearing on pins a and b from sequencer 86. When the addition is completed, the sum is read into memory 92 via pin d and through gate 112, which is opened by SDA 110. When this step is complete, decoder 110 is reset to zero by a signal on pin e. The transponder is now removed from the register and all normal functions are restored. The data from the transaction is transferred from computer 142 to a permanent computerized bookkeeping system.

Figure 5:
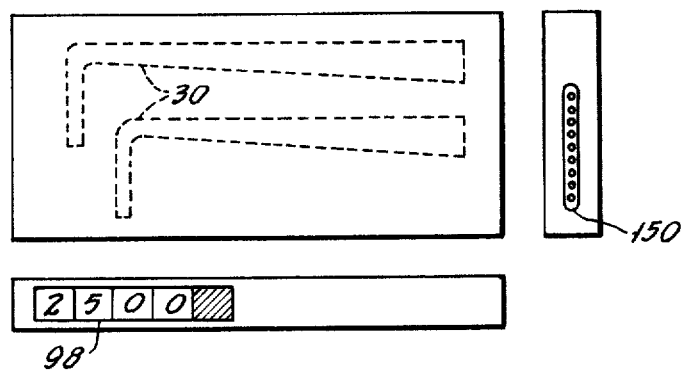
FIG. 5 illustrates external details of the vehicle transponder.

FIG. 5 illustrates the exterior of a typical vehicle transponder. It is about 4"×2"×⅜", encased in plastic. Antenna array 30 is imbedded in the plastic case located a quarter wavelength above a ground plane. The antenna is a metal foil, end fed tapered array with 90° bends to make the physical orientation of the transponder not important to its function. Liquid crystal display 98 indicates the current balance and the battery condition. The pin array, 150, contains all the pins described previously for increasing the pre-paid balance. The permanent cash collection agent's name is also inscribed on the plastic case.

Figure 6:
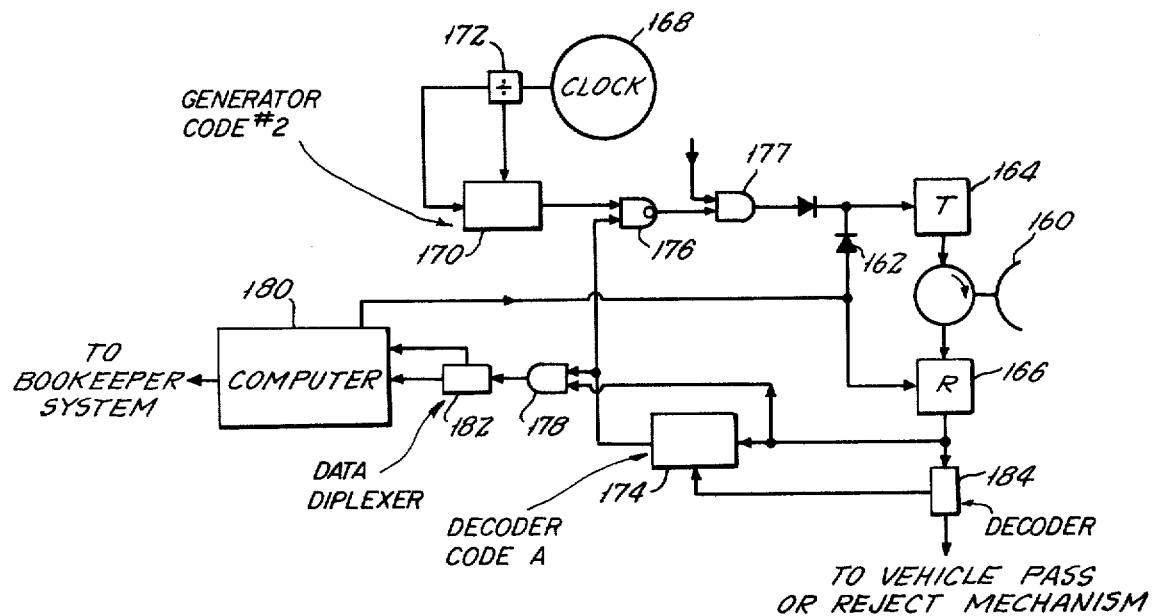
FIG. 6 illustrates a functional block diagram of a payment toll booth transponder.

FIG. 6 illustrates a preferred functional block diagram of the toll payment transponder. Antenna 160 generates a beam that is approximately 15° wide in all directions. Ferrite duplexer 162 connects Gunn oscillator transmitter 164 and super-heterodyne receiver 166 to antenna 160. Receiver 166 is squelched whenever transmissions occur. Clock 168 controls the transponder. It periodically actuates code 2 generator, 170. The transmit period being determined by divider 172. When code A is received from a vehicle transponder it is identified by decoder 174 which closes gate 176 and opens gate 178, passing the vehicle's identification numbers into computer 180 through data diplexer 182. When the toll is computed, code 3 is generated and is followed by the toll amount. The vehicle-owner identification code and the toll is read out of computer 180 into an independent bookkeeping system. When the end of message code is received by decoder 184 with a negative balance indication, a vehicle non-admittance sequence is actuated, otherwise a vehicle pass indication is actuated. The end of message code resets decoder 174. If vehicles remain stopped at a toll entrance for periods of more than several minutes, a stopped vehicle detector closes gate 177 and stops all transactions until suitable vehicle motion is detected. This prevents stalled vehicles from being billed several times.

Figure 7:
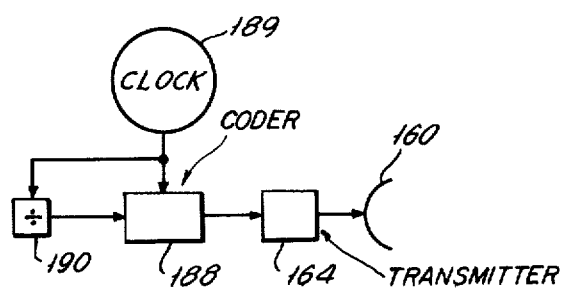
FIG. 7 illustrates a functional block diagram of an entrance location identifying toll booth transponder.

FIG. 7 illustrates a preferred functional block diagram of a turnpike entry location read-in transponder. Antenna 160 and transmitter 164 comprise the microwave components. Clock 189 periodically activates coder 188 through divider 190. Coder 188 generates entry code 2 and the entrance location code.

Although the preferred system described here depends on an advance payment, a credit system can also be adapted where instead of subtracting from a pre-paid balance a sum is continually added to the memory. The system, as a pre-paid system, is also useful in parking lots, high speed refueling stations, as a pass to enter restricted areas or for any other billing or paying system where the speed of the transaction is significant. The system can also be modified for receiving roadway information. Most of the illustrative circuits described use hard wired logic. Microprocessors with software can also be programmed to do the same functions.

I claim:

1. A universally applicable, automatic, vehicular toll paying system comprised of,
 a pre-paid cash balance registration means that electronically extracts stored data from and inserts a newly computed pre-paid cash balance into the memories associated with a vehicle borne transponder-data-processor, and then transfers all said registration data to an independent bookkeeping system,
 a vehicle borne microwave transponder-data processor that permanently stores, in its read-only-memory, a vehicle-owner code, a payment agent code and a vehicle class code; receives vehicle entry location data, by microwave transmission, for temporary storage in one of its read-write memories, and upon subsequent coded interrogation, transmits all said identification and entry location data, receiving back a toll amount from a pre-paid balance that is stored in a second read-write memory, said balance being visually displayed; and upon completion of the subtraction, transmitting a code that indicates if the balance is negative or not,
 a toll booth transponder-computer which periodically transmits, by microwave, an interrogation code and receives back from a passing vehicle transponder, following the interrogation, stored data from which said transponder-computer calculates a toll and transmits said toll amount back to said vehicle transponder, receiving back either a pass or reject code, or no response, said response activating appropriate vehicle pass or reject apparatus and the results of said transaction are transferred to an independent bookkeeping system, and
 a toll system entry location microwave transmitter, that periodically transmits a fixed code followed by that entry location's identification code.

2. A universally applicable, automatic toll paying method is comprised of the steps of,
 electronically inserting the amount of cash pre-paid to a collection agent, into the memory of a vehicle borne microwave transponder-data processor by means of an individual entry code, said code being derived from said vehicle transponder's permanently stored identification codes,
 receiving and temporarily storing appropriately coded vehicle entry location data that is transmitted from a roadside data entry transmitter to a passing vehicle's transponder upon its entry to a toll facility, said data being later used for a toll computation, and
 transmitting permanently stored vehicle-owner and vehicle class identification codes, a collection agent code and temporarily stored entry location data, if applicable, from said vehicle transponder, after interrogation from a microwave transponder-computer located at an automatic toll collection booth, said transponder-computer upon receipt of said data calculates a toll and transmits said toll amount to said vehicle transponder where the toll is fed into a subtraction register, subtracted from the stored pre-paid cash balance, said balance being displayed to vehicle occupants, and if new balance is not negative, sends a transaction acceptance or rejection code to said toll booth transponder to actuate appropriate vehicle pass or obstruct apparatus, and finally enters said toll charge and vehicle identification codes into an independent bookkeeping system for purpose of billing the collection agent and serving other record keeping functions.

3. A universally applicable, automatic toll paying system that is comprised of,
 a cash balance increase registration means that connects with a vehicle borne microwave transponder-data processor to extract an owner-vehicle identification code, a payment agency identification code and the current stored balance; adds the cash payment to the current stored balance gaining entry to said transponder for said procedure using a code determined from said identification codes by cryptographic procedures programmed into said register's computer; and reads out said vehicle-owner identification codes, the cash paid and the new balance into an independent bookkeeping system,
 a vehicle borne, microwave transponder-data processor which stores vehicle entry location codes received from roadside data entry transmitters and upon interrogation from a toll collecting transponder, reads out and erases said entry location codes and reads out the permanently stored owner-vehicle identification codes and payment agent code, and then receives, by return microwave transmission, a computed toll amount which is read into a subtraction register, subtracts toll from said stored current pre-paid balance, the old balance being erased and said new balance is read into the memory and visually displayed, and transaction acceptance or rejection code is transmitted, telling whether subtraction results is a negative balance or not, and
 a toll booth microwave transponder-computer that interrogates passing vehicles by coded, narrow beamed microwave transmissions requesting stored data from passing vehicle transponders, and upon receipt of said stored data, calculates the toll, transmits toll amount by coded microwave transmission, and subsequently receives a transaction approval or rejection code which activates appropriate vehicle pass or reject mechanism and also transfers said toll, vehicle owner identification code and payment agent code into an independent bookkeeping system.

4. Same as claimed in claim 3, but where the vehicle transponder includes a tone generator that is activated when a negative or zero pre-paid balance appears in the cash balance memory following its interrogation.

5. Same as claimed in claim 3, but optionally including an independent means to check vehicle class or size at toll payment booth so as to verify vehicle identification class data stored in vehicle transponder's read only memory, and also to include a means to inhibit vehicle passage if check is not positive.

6. Same as claimed in claim 3, but including a half duplex, amplitude modulated, data and clock transmission method in which clock information is sent as short pulses preceding each data bit and data bits consist of trapezoidal pulses for "ones" and no-pulses for "zeros", said composite signal is separated after reception by a differentiating circuit, an integrating circuit and diode thresholders in both circuits, said separation resulting in one output lead containing data and another output lead containing clock information.

7. A universally applicable, automatic toll paying apparatus comprised of,
- a vehicle mounted microwave transponder-data processor, which includes a wide beam microwave antenna; a microwave detector and very low power transmitter; a permanent read only memory; a temporary read-write memory; a shift register for performing subtraction; a read-write memory and associated electronic display for retaining current cash balance; transaction sequence control circuitry; and a decoder that responds to an individually derived crypto code, which controls balance increasing transactions,
- a toll booth microwave transponder-computer which includes a relatively narrow beam microwave antenna; a moderate power microwave transmitter and super heterodyne receiver; a computer, for computing a toll from received information; a vehicle pass means for responding to a received transaction approval code; a means for transferring toll and vehicle and collection agent codes from computer into an independent bookkeeping system, and
- a microwave transmitter, located at entry locations to a toll facility where tolls are computed based on where vehicle entered and exited the facility, periodically transmits a vehicle transponder entry code followed by a code that identifies the entry location,
- a cash balance increase registration means that includes a means for electrically and electromagnetically connecting said registration means to said vehicle borne transponder; a microwave receiver-transmitter; a computer for determining the correct individual entry code from the vehicle mounted transponder's permanently stored identification codes; a summing register, which receives the current stored balance from said vehicle transponder's memory adds the cash payment and inserts new balance with said entry code; and a means for transferring paid cash amount, current cash balance and vehicle identification codes into an independent bookkeeping system for cash and credit transfers.

8. Same as claimed in claim 7, in which the vehicle transponder includes a latched battery power switch that applies d.c. power to all circuits, except the transponder, the pre-paid balance memory and the display, which always receive power, and said switch, normally opened, is latched closed when microwave energy is detected, said latch being removed and switch opened upon receipt of end-of-transaction-signal, after which said switch is inhibited from being closed again for several minutes by a continuously powered timing circuit.

9. Same as claimed in claim 7 in which the vehicle's microwave transponder is comprised of a single microwave device serving as both a detector of microwave energy and a source of transmitted microwave energy, being operated as one or the other sequentially by a d.c. bias across said device.

10. Same as claimed in claim 9 in which microwave transponder device is comprised of a microwave tunnel diode, a tuning inductor, a by-pass capacitor and two series quarter wave sections with a shunt microwave resistor between them.

* * * * *